(12) United States Patent
Cook et al.

(10) Patent No.: US 12,052,938 B1
(45) Date of Patent: *Aug. 6, 2024

(54) RIDING HYDRAULICALLY DRIVEN AERATOR

(71) Applicant: Stinger Equipment, Inc., LaGrange, KY (US)

(72) Inventors: David Michael Cook, LaGrange, KY (US); Joshua Michael Otto, Crestwood, KY (US)

(73) Assignee: STINGER EQUIPMENT, INC., Lagrange, KY (US)

( * ) Notice: Subject to any disclaimer, the term of this patent is extended or adjusted under 35 U.S.C. 154(b) by 446 days.

This patent is subject to a terminal disclaimer.

(21) Appl. No.: 17/314,392

(22) Filed: May 7, 2021

Related U.S. Application Data

(63) Continuation of application No. 16/161,772, filed on Oct. 16, 2018, now Pat. No. 10,999,964.

(60) Provisional application No. 62/573,818, filed on Oct. 18, 2017.

(51) Int. Cl.
*A01B 45/02* (2006.01)
*A01B 33/08* (2006.01)

(52) U.S. Cl.
CPC .......... *A01B 45/026* (2013.01); *A01B 33/082* (2013.01)

(58) Field of Classification Search
CPC .............................. A01B 45/026; A01B 33/082
See application file for complete search history.

(56) References Cited

U.S. PATENT DOCUMENTS

| | | |
|---|---|---|
| 101,540 A | 4/1870 | Altaveau |
| 854,424 A | 5/1907 | Ketterer |
| 925,565 A | 6/1909 | Curtis |
| 1,157,670 A | 10/1915 | Boswell |
| 1,383,294 A | 7/1921 | Gardner |
| 1,778,334 A | 10/1930 | Pedersen |
| 2,051,443 A | 8/1936 | Franklin |
| 2,071,324 A | 2/1937 | Bateman |
| 2,205,997 A | 6/1940 | Wallace et al. |
| 2,229,497 A | 1/1941 | Dontje |
| 2,539,253 A | 1/1951 | Jorgensen |
| 2,545,059 A | 3/1951 | Ward |

(Continued)

FOREIGN PATENT DOCUMENTS

| | | |
|---|---|---|
| CA | 366396 | 5/1937 |
| EP | 0140989 | 5/1985 |

(Continued)

OTHER PUBLICATIONS

Lawn Solutions 24" Dual Hydro Aerator, You Tube Video published on Nov. 27, 2010, https://www.youtube.com/watch?v=Yy2jG6vdwHU, Web.

(Continued)

*Primary Examiner* — Tara Mayo
(74) *Attorney, Agent, or Firm* — Gray Ice Higdon

(57) ABSTRACT

A riding hydraulically driven aerator is disclosed herein. The aerator includes a frame, an engine, one or more hydraulic pumps, one or more drive wheels, one or more tine assemblies, and one or more hydraulic motors. The hydraulic motors are coupled to the drive wheels and to the tine assemblies. The hydraulic pumps provide power to the hydraulic motors and are coupled to the engine with a toothed timing belt.

11 Claims, 13 Drawing Sheets

(56) References Cited

U.S. PATENT DOCUMENTS

| | | | |
|---|---|---|---|
| 2,645,987 A | 7/1953 | Brooks | |
| 2,667,026 A | 1/1954 | Ingram | |
| 2,713,816 A | 7/1955 | Berg | |
| 2,824,506 A | 2/1958 | Smithburn | |
| 3,140,677 A | 7/1964 | Fraser | |
| 3,224,512 A | 12/1965 | Alexander | |
| 3,570,604 A | 3/1971 | Allard | |
| 3,675,724 A | 7/1972 | Schneider | |
| 3,685,469 A | 8/1972 | Rogers | |
| 3,907,053 A | 9/1975 | Savage | |
| 4,037,544 A | 7/1977 | Cantone | |
| 4,081,034 A * | 3/1978 | Hines | A01B 45/02 |
| | | | 172/22 |
| 4,336,700 A | 6/1982 | Cohen | |
| 4,550,783 A | 11/1985 | Hansen | |
| 4,574,890 A | 3/1986 | Hansen et al. | |
| 4,602,687 A | 7/1986 | Hansen | |
| 4,638,867 A | 1/1987 | Hansen et al. | |
| 4,645,012 A | 2/1987 | Hansen et al. | |
| 4,723,607 A | 2/1988 | Hansen | |
| 4,750,565 A | 6/1988 | Hansen et al. | |
| 4,753,298 A | 6/1988 | Hansen et al. | |
| 4,773,486 A | 9/1988 | Huber et al. | |
| 4,830,145 A | 5/1989 | Hansen | |
| 4,867,244 A | 9/1989 | Cozine et al. | |
| 4,878,802 A | 11/1989 | Hansen et al. | |
| 4,901,655 A | 2/1990 | Magda | |
| 4,926,768 A | 5/1990 | Magda | |
| 4,926,947 A | 5/1990 | Cozine et al. | |
| 5,375,541 A | 12/1994 | McGann | |
| 5,398,767 A | 3/1995 | Warke | |
| 5,628,369 A | 5/1997 | Brown | |
| 5,680,903 A | 10/1997 | Oliver | |
| 5,974,771 A | 11/1999 | Greenan | |
| 6,102,129 A | 8/2000 | Classen | |
| 6,249,993 B1 | 6/2001 | Armstrong | |
| 6,273,197 B1 | 8/2001 | Marlow | |
| 6,347,593 B1 | 2/2002 | Moran | |
| 6,708,773 B1 | 3/2004 | Kinkead et al. | |
| 6,941,739 B1 | 9/2005 | Gliser | |
| 7,392,854 B2 | 7/2008 | Ikeda | |
| 8,291,991 B1 | 10/2012 | Cook | |
| 8,733,477 B1 | 5/2014 | Cook | |
| 9,623,903 B2 | 4/2017 | Cook | |
| 9,750,172 B2 | 9/2017 | Moore | |
| 10,779,455 B1 | 9/2020 | Cook | |
| 10,999,964 B1 | 5/2021 | Cook | |
| 2003/0201107 A1 | 10/2003 | Smith | |
| 2004/0069194 A1 | 4/2004 | Wyne | |
| 2006/0048952 A1 | 3/2006 | Classen | |
| 2006/0070750 A1 * | 4/2006 | Classen et al. | A01B 33/082 |
| | | | 172/22 |
| 2007/0074645 A1 | 4/2007 | Kinkead | |
| 2008/0229987 A1 | 9/2008 | Dryden | |
| 2010/0044125 A1 | 2/2010 | Witzigman | |
| 2012/0298022 A1 | 11/2012 | Bowen | |
| 2015/0107863 A1 | 4/2015 | Bryant | |
| 2016/0227702 A1 | 8/2016 | Lietaer | |
| 2017/0311533 A1 | 11/2017 | Lapp | |
| 2019/0217319 A1 | 7/2019 | Harvey | |
| 2019/0357417 A1 | 11/2019 | Chahley | |

FOREIGN PATENT DOCUMENTS

| | | |
|---|---|---|
| EP | 2491777 | 8/2012 |
| GB | 472443 | 9/1937 |
| GB | 965436 | 7/1964 |
| GB | 2347400 | 9/2000 |

OTHER PUBLICATIONS

Lawn Solutions Riding Aerator, You Tube Video published on Nov. 28, 2010, https://www.youtube.com/watch?v=Xc-eelbjN5w, Web.

Turfco XT5 Hydro Aerator, You Tube Video published on Mar. 24, 2016, https://www.youtube.com/watch?v=AaSXe9gStPs, Web.

Ryan Mataway Overseeder Jul. 22, 2019.

The Toro Company 20" Hydraulic Slit Seeder 2019.

Billy Goat Industries, Inc. Overseeders & Power Rakes 2019.

Bluebird Turf 22" BlueBird Seeder 2019.

U.S. Appl. No. 63/091,031, filed Oct. 13, 2020 titled Vehicle Articulating and Caster Steering.

U.S. Appl. No. 63/088,288, filed Oct. 6, 2020 titled Seeding Attachment for Riding Aerator.

Classen PowerSteer Aerators Power The Turn, You Tube Video, https://www.youtube.com/watch?v=d4zA1n2bHPI, published Apr. 7, 2015.

Turfco Direct TurnAer Aerators, You Tube Video, https://www.youtube.com/watch?v=y2cuc0MNSIc, published Jul. 16, 2009.

Classen Riding Aerator, You Tube Video, https://www.youtube.com/watch?v=JI7nNjDI6D8, published Jul. 27, 2010.

Exmark Manufacturing Inc., 24" Stand-On Aerator, You Tube Video, https://www.youtube.com/watch?v=RAMkD4AKRgl, published Dec. 29, 2017.

* cited by examiner

RIDING HYDRAULICALLY DRIVEN AERATOR

CLAIM TO PRIORITY

This continuation patent application claims priority to and benefit of, under 35 U.S.C. § 120, U.S. patent application Ser. No. 16/161,772, filed Oct. 16, 2018, which claims priority to U.S. Provisional Patent Application Ser. No. 62/573,818, filed Oct. 18, 2017, and titled "Riding Hydraulically Driven Aerator", all of which is incorporated by reference herein.

TECHNICAL FIELD

Generally, a riding hydraulically driven aerator is taught.

BACKGROUND

Aerating turf has grown from the golf course industry to a popular service provided to residential lawns because aerating relieves soil compaction and provides better air and water exchange with the turf root system. Relieving soil compaction and strengthening the root system decreases the need for fertilization and irrigation.

Aerating turf has grown from the golf course industry to a popular service provided to residential lawns because aerating relieves soil compaction and provides better air and water exchange with the turf root system. Relieving soil compaction and strengthening the root system decreases the need for fertilization and irrigation.

Due to the popularity of aerating residential lawns, small and more compact aerators have been developed from the original golf course aerators. The majority of home aerators are small walk-behind models and used in homeowner rental applications. Commercial contractors who provide an aeration service have been switching over to newer riding aerators.

These new riding aerators allow the operator to stand on a platform on the back of the machine. The machine normally has powered rear wheels that are used for transporting, turning, and aerating. The aerator tines on these machines are also typically driven for better traction and aerating performance. These tines can be raised and lowered by the operator allowing the machine to stop aerating and quickly lower them to start aerating again. Because the tines are driven on these machines, the aerator is able to utilize the weight of the machine and of the operator to increase the depth you can aerate hard soil. Only when the tines are driven are they able to utilize the full weight of the machine and operator to aerate and turn effectively.

These riding aerators utilize multiple chains, sprockets, drive shafts, and bearings which all require extensive maintenance and break down frequently. The maintenance required on these riding aerators includes tensioning the chains frequently, cleaning dirt and mud from sprockets, and lubricating the chains. Without such maintenance the chains on such aerators will eventually rust, break, or come off. Even if all of this maintenance is completed, the chains still tend to break down due to other chain related issues. Depending on use, after a few years, the chains and sprockets will need to be replaced which is very expensive and very time consuming, and normally needs to be done by a professional due to the complexity of the machine.

Even with all this maintenance and high operating costs, professional contractors are switching to riding aerators due to their high productivity over walk-behind aerators. Thus, there is a need for a riding aerator that does not have the drawbacks of the current riding aerators that have the daily maintenance requirements and expensive replacement costs associated with the chains and sprockets.

SUMMARY

Generally, in one aspect, an aerator is provided. The aerator includes a frame, an engine, one or more hydraulic pumps, one or more drive wheels, and one or more tine assemblies. The one or more tine assemblies may be driven by one or more hydraulic tine motors. The one or more hydraulic pumps may provide power to the one or more hydraulic motor, and the one or more hydraulic pumps may be coupled to the engine with a toothed timing belt.

BRIEF DESCRIPTIONS OF THE DRAWINGS

DETAILED DESCRIPTION

Figure 1:
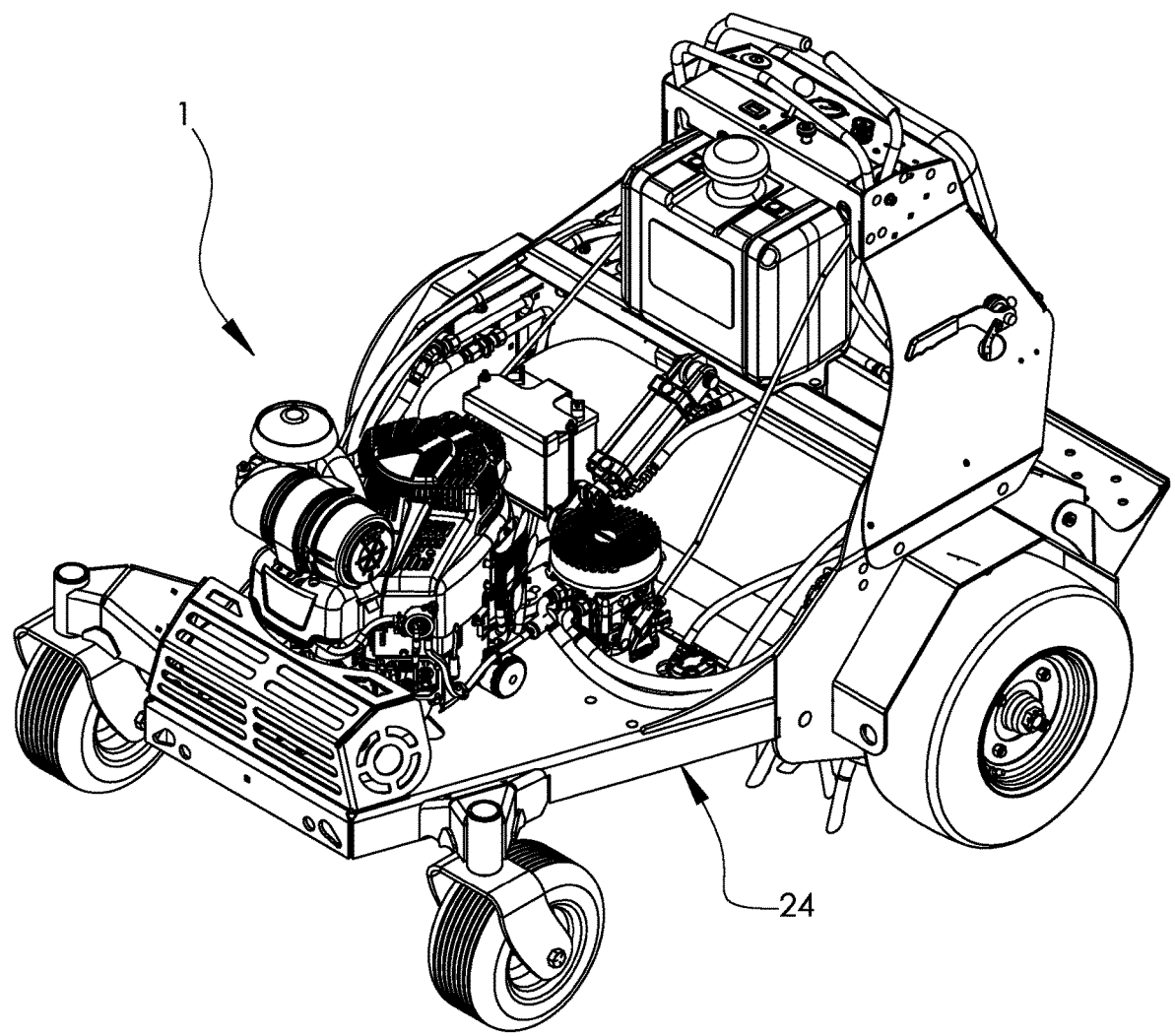
FIG. 1 is an isometric view of an embodiment of a riding aerator.
Figure 2:
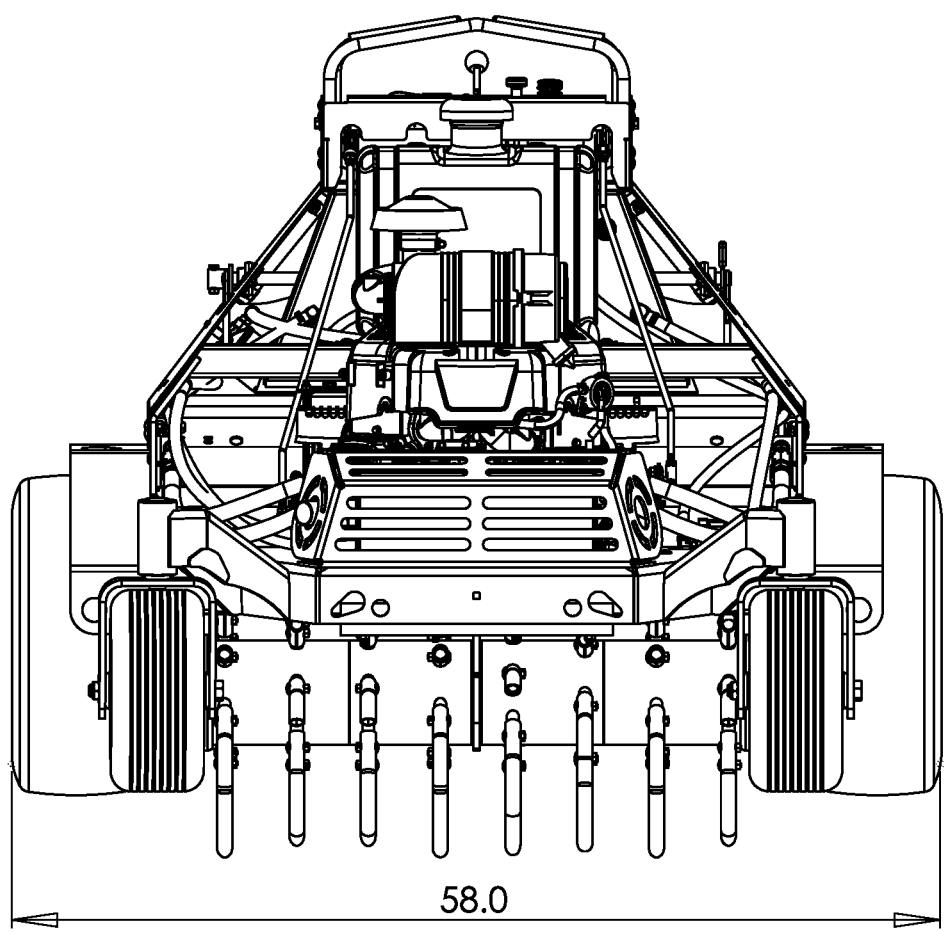
FIG. 2 is a front view of the riding aerator in FIG. 1.
Figure 3:
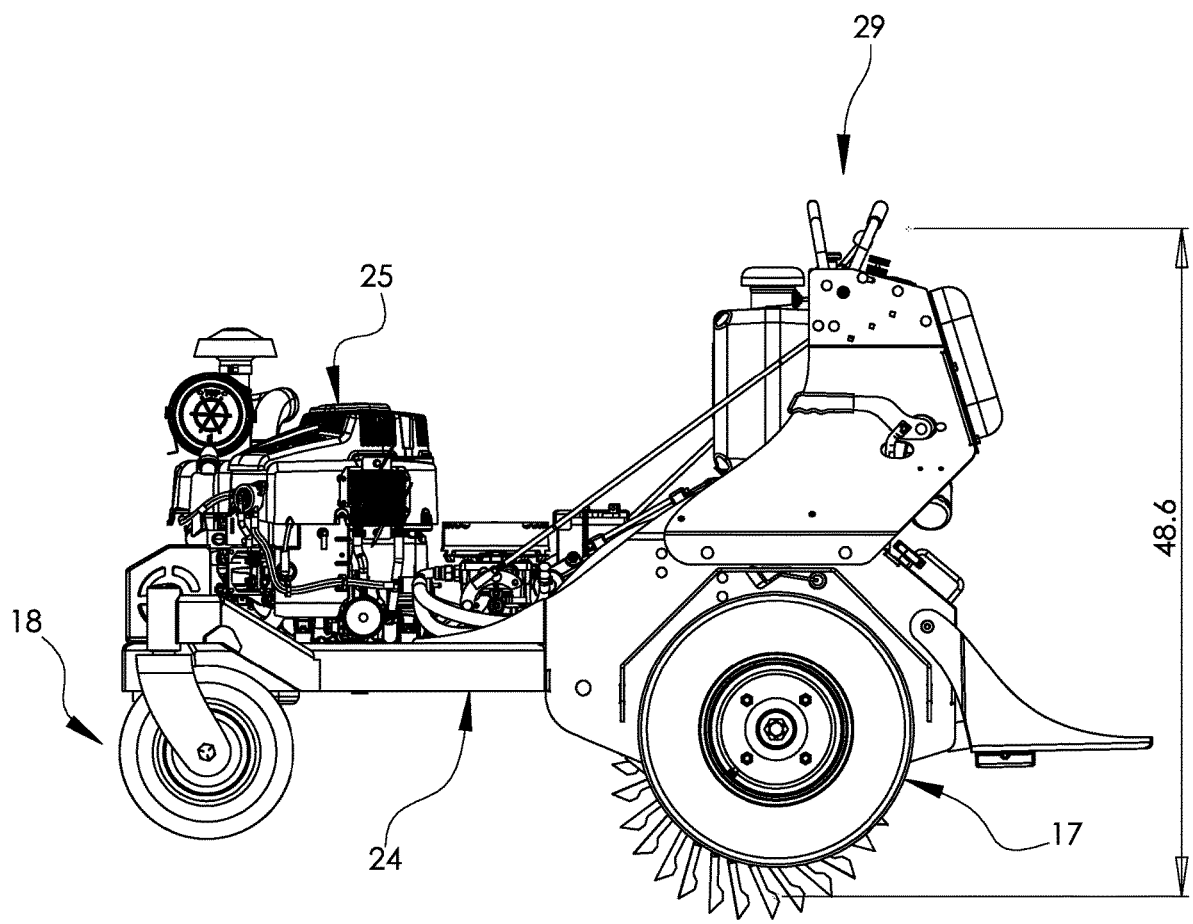
FIG. 3 is a side view of the riding aerator in FIG. 1.

FIGS. 1-13 show an embodiment of a riding aerator 1. The dimensions shown in FIGS. 1-13 are in inches unless otherwise noted; however, the dimensions provided are solely for illustrative purposes and are not intended to be limiting. A person of skill in the art will recognize that the dimensions of an aerator, and various components therein may vary depending on a variety of factors.

Referring now generally to FIGS. 1-6, an example embodiment of a riding aerator 1 is illustrated in varying views. The illustrated embodiment of the aerator 1, may include a frame 24, having front, back, left, and right sides, and an engine 25 mounted on frame 24. The engine 25 may also supply power to a first hydraulic pump 26, a second hydraulic pump 27, and a gear pump 28. The frame 24 may also support a control tower assembly 29 which allows the operator to control the aerator. The frame may also further support a trail arm drive assembly 10 and a hydraulic cylinder 30. The hydraulic cylinder 30 may connect to both the frame 24 and the trail arm drive assembly 10 and can be used to raise and lower the trail arm drive assembly 10 and thus the tines. The frame 24 may also support the operator platform 40 which the operator stands on when operating the aerator 1.

Figure 4:
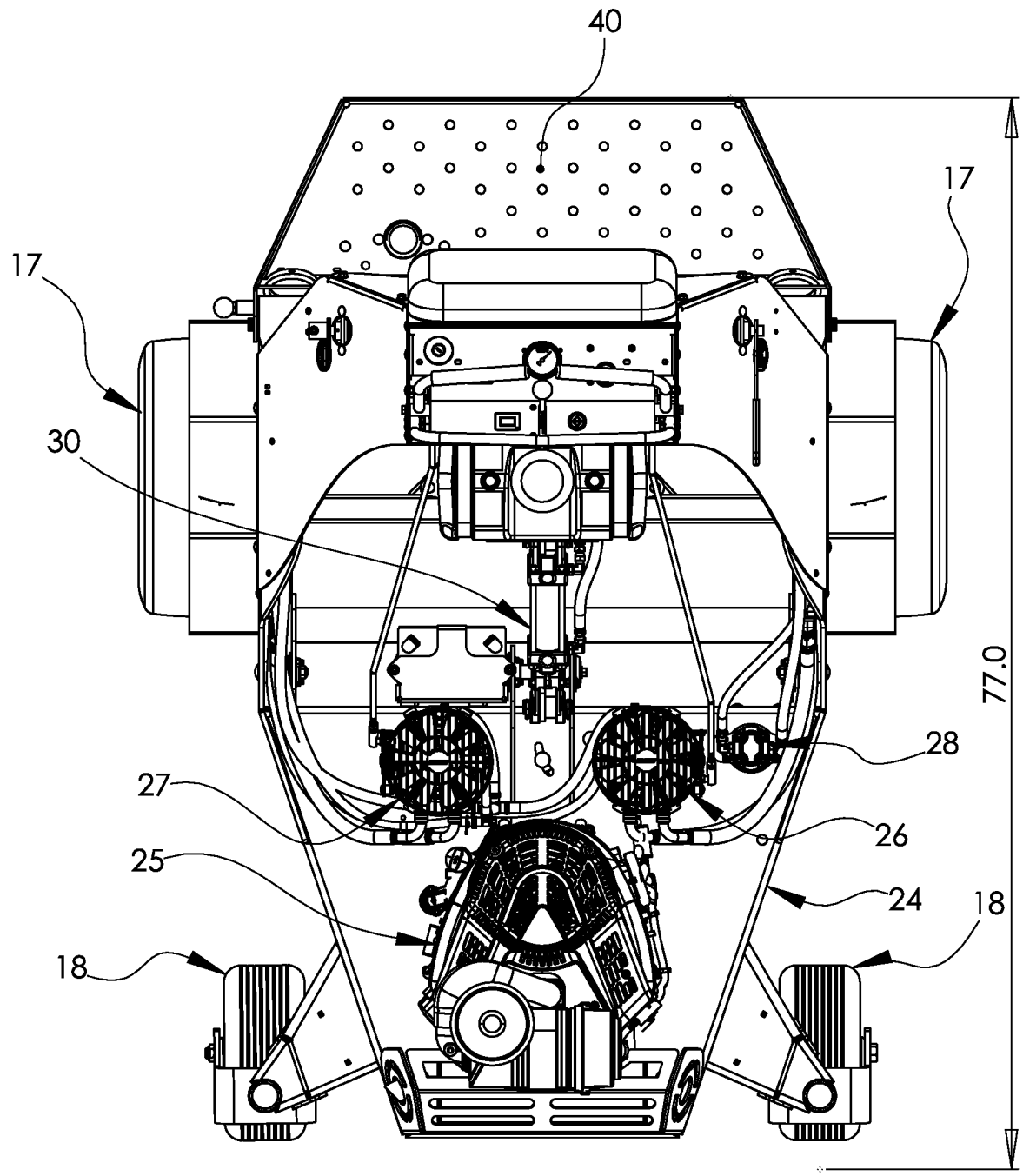
FIG. 4 is a top view of the riding aerator in FIG. 1.
Figure 5:
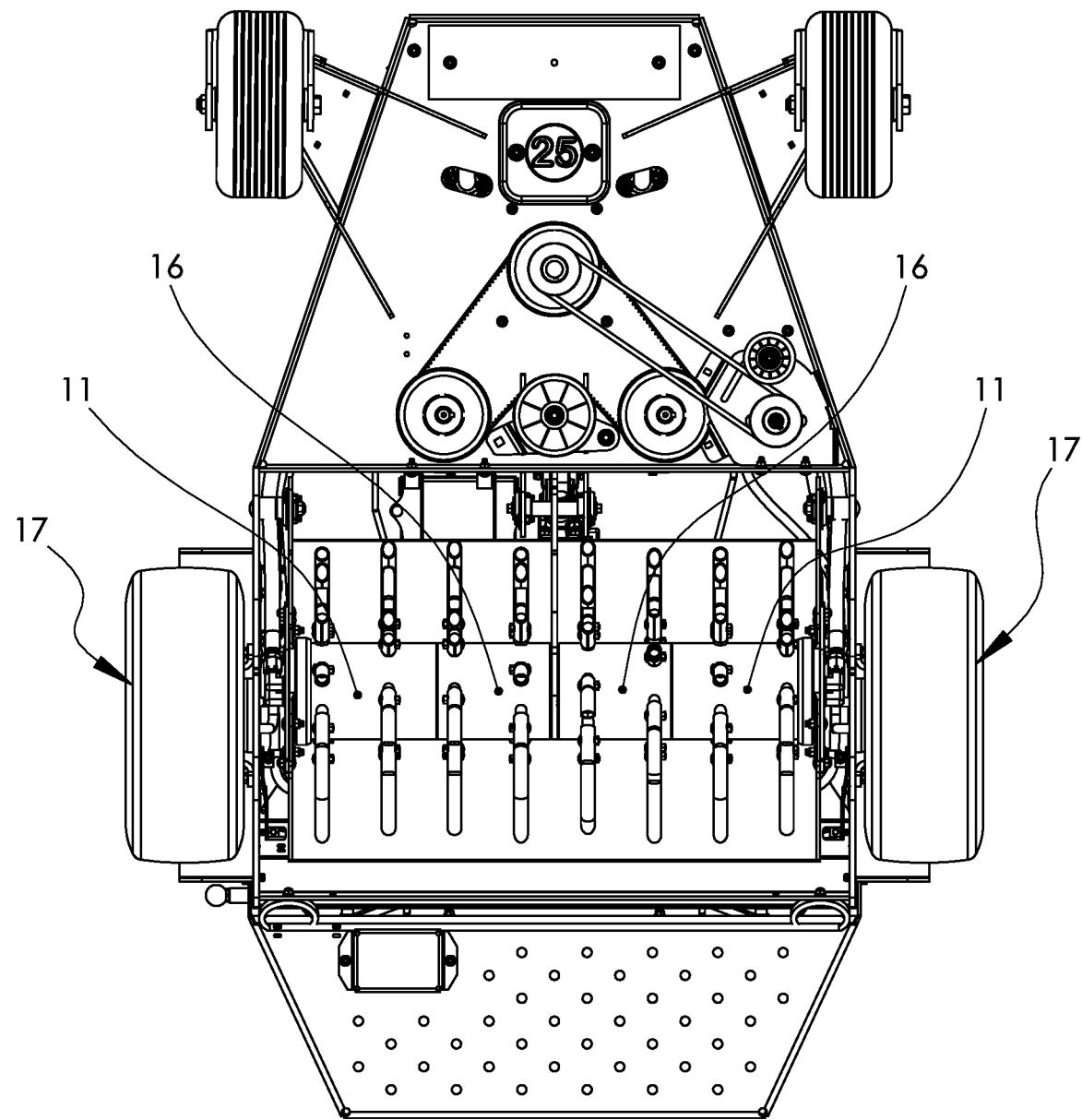
FIG. 5 is a bottom view of the riding-aerator in FIG. 1.

FIGS. 2-5 show the front, side, top, and bottom views of one embodiment of riding aerator 1. FIG. 4 shows the location of the first and second hydraulic drive pumps 26 and 27, and the rear drive wheels 17 which may be mounted to the frame 24 and used to drive the aerator during transport and while aerating. The front idler wheels 18 may be used as casters to roll and pivot depending on the direction aerator 1 is going. FIG. 5 shows the bottom of the aerator 1 and specifically the location of the drive tine assemblies 11 which may be used to drive the aerator 1 along with the drive wheels 17 but only when aerating. The drive wheels 17 and drive tine assemblies 11 may be powered in series with each other. In other words, in certain embodiments, if the right drive wheel 17 turns forward, the right drive tine assembly 11 turns forward, and vice versa. Further, if the left drive wheel 17 turns forward, the left drive tine assembly 11 turns forward, and vice versa. Similarly, if the right drive wheel 17 turns in reverse, the right drive tine assembly 11 turns in reverse, and vice versa. And, if the left drive wheel 17 turns in reverse, the left drive tine assembly 11 turns in reverse, and vice versa. Float tine assemblies 16 are allowed to freely turn to make turning easier when aerating.

Figure 6:
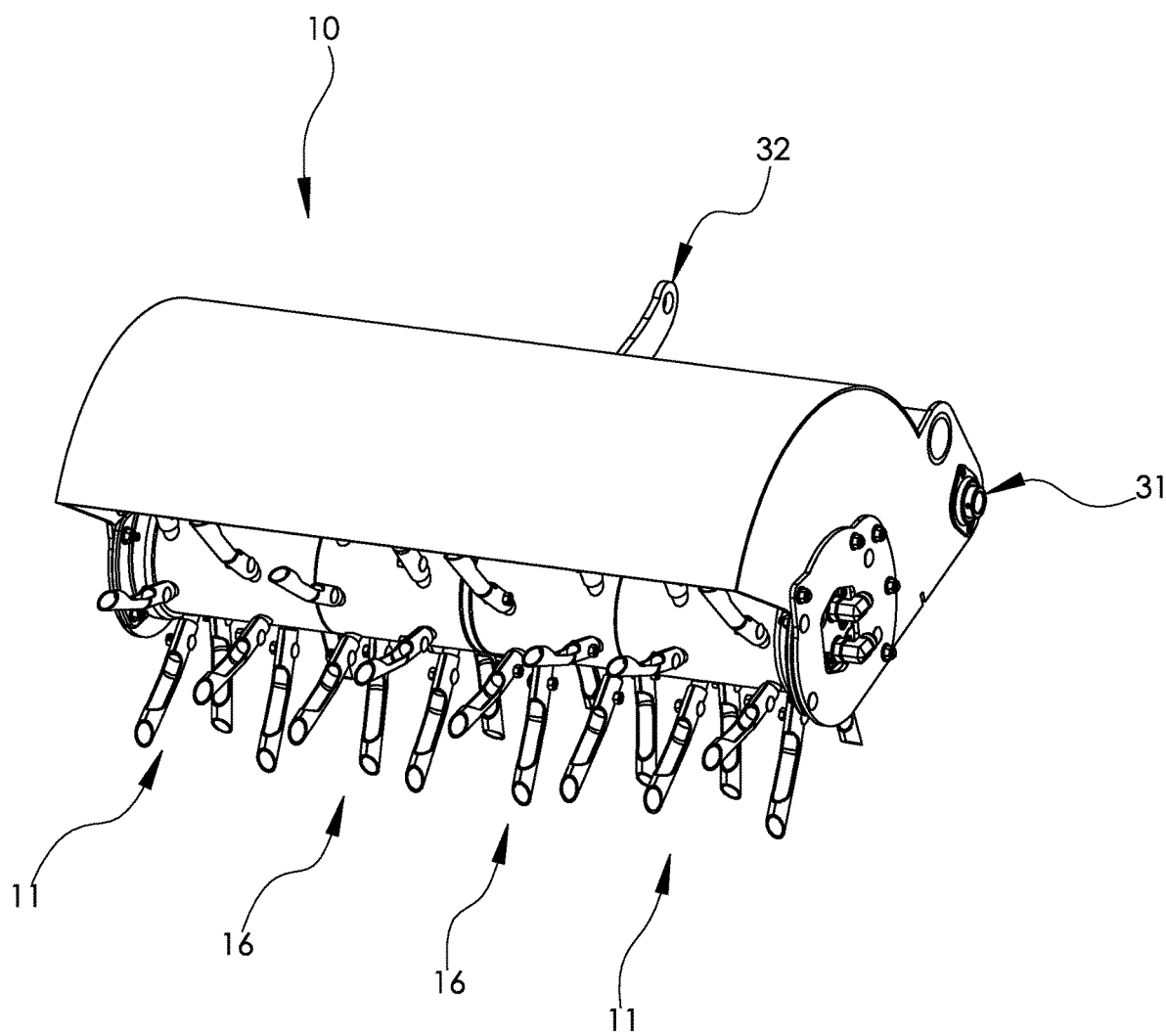
FIG. 6 is an isometric view of the trail arm drive assembly from the riding aerator in FIG. 1.

FIG. 6 shows the trail arm drive assembly 10. This assembly is mounted to frame 24 and pivots on the frame with bearing 31. The hydraulic cylinder 30 mounts to connector 32 at one end and frame 24 at the other end and can be operated to raise and lower the trail arm drive assembly 10 when aerating. The trail arm drive assembly 10 includes two drive tine assemblies 11 and two float tine assemblies 16. The drive tines assemblies 11 are powered by the hydraulic pumps 26 and 27 independently.

Figure 7:
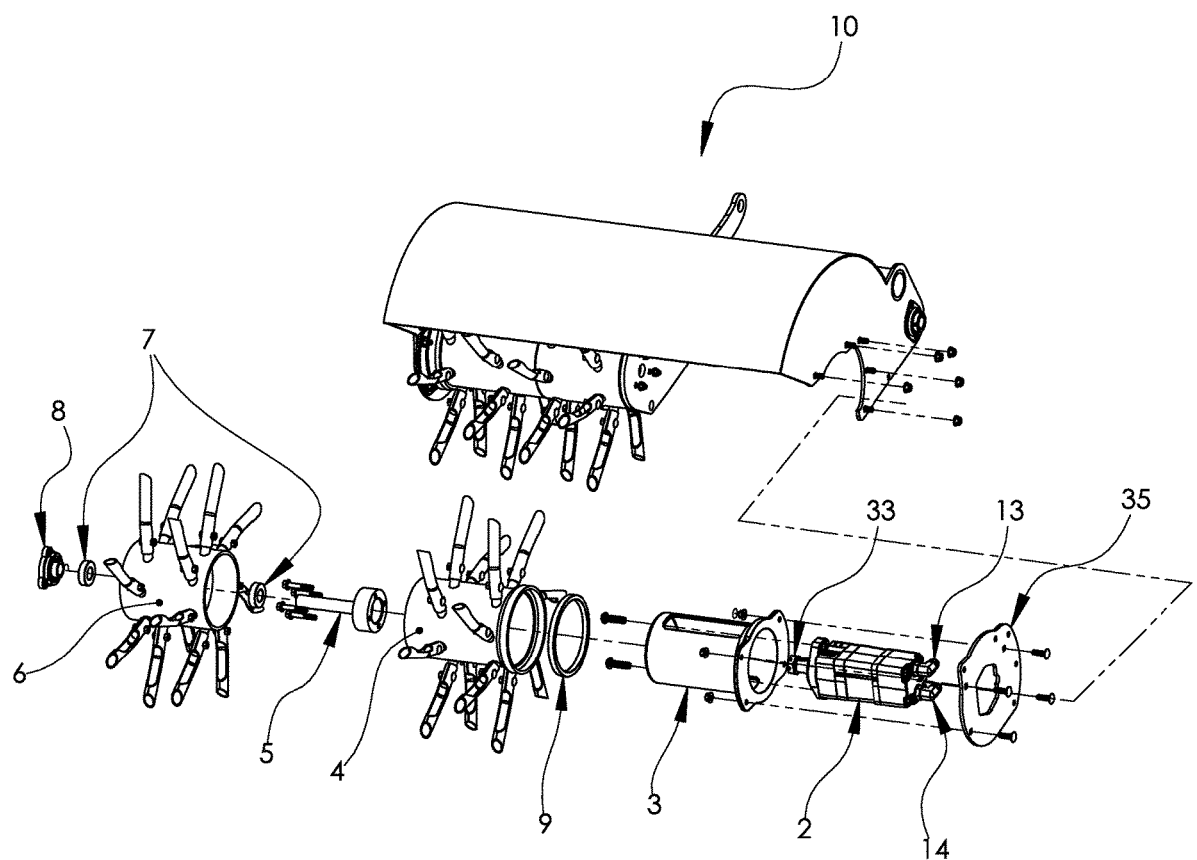
FIG. 7 is an exploded view of the trail arm drive assembly from the riding aerator in FIG. 1.

FIG. 7 shows an exploded view of the trail arm drive assembly 10 from FIG. 6. The exploded view shows only the detail of the right side of the trail arm drive assembly. The left side is a mirrored setup of the right side trail arm drive assembly. The hydraulic tine motor 2 is mounted to the tine motor casting 3 which bolts to mounting plate 35. Bearing 9 is pressed into drive tine drum 4 then the drive tine drum 4 is pressed onto the taper axle of the hydraulic tine motor 2 and tightened down with the jam nut 33. Float tine axle 5 is bolted to the drive tine drum 4 using four bolts. The bearings 7 are placed inside the float tine drum 6 and then slide into place on the float tine axle 5, which is connected to inner bearing 8. The drive tine drum 4 is powered forward and in reverse by the hydraulic tine motor 2. The float tine drum 6 is allowed to freely rotate about the float tine axle 5 to allow for easy turning while aerating.

Figure 8:
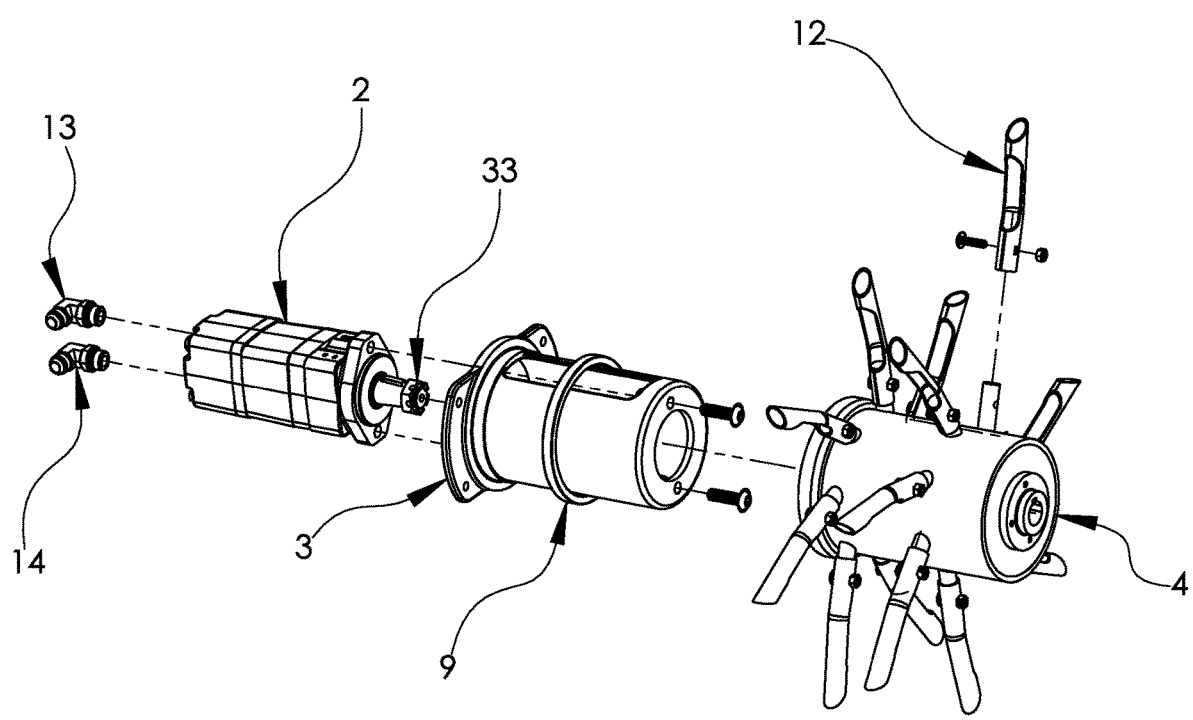
FIG. 8 is an exploded view of the drive tine assembly from the riding aerator in FIG. 1.

FIG. 8 shows a detailed exploded view of the right drive tine drum 4. There is a drive tine drum 4 on both the right and left of the trail arm drive assembly 10. In some embodiments such as illustrated herein, each drive tine drum may be a mirrored setup of the other. The hydraulic tine motor 2 in this example is powered forward by hydraulic fluid being pumped by hydraulic pump 27 into port 14, which then comes out of port 13. The drive tine drum 4 has fourteen aerator tines 12 attached to the drive tine drum 4 using one nut and one bolt each. However, more or less tines can be used.

Figure 9:
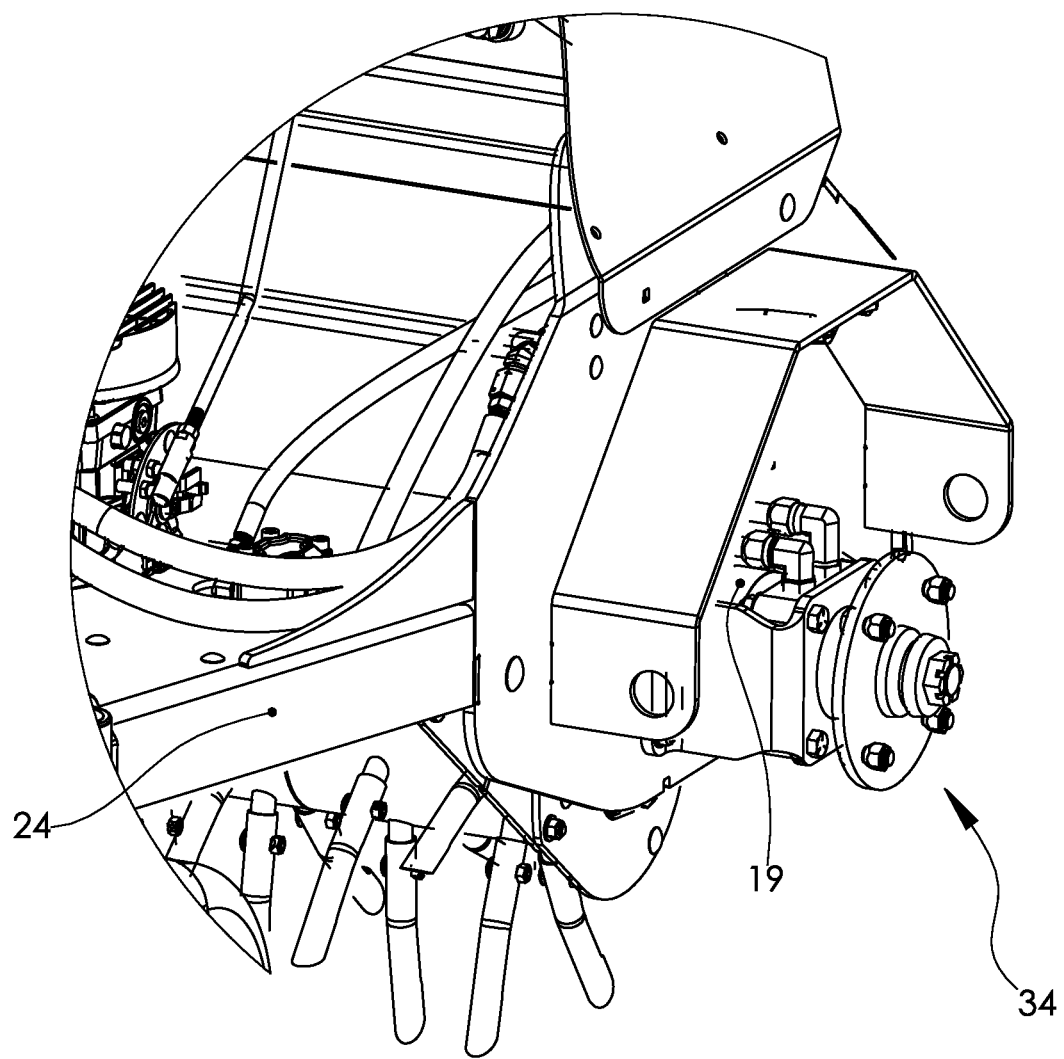
FIG. 9 is close up view of the rear drive wheel assembly with the wheel removed from the riding aerator in FIG. 1.

FIG. 9 shows a close view of the rear drive wheel assembly 34 showing hydraulic wheel motor 19 mounted to frame 24. This setup may be mirrored on both sides of the aerator.

Figure 10:
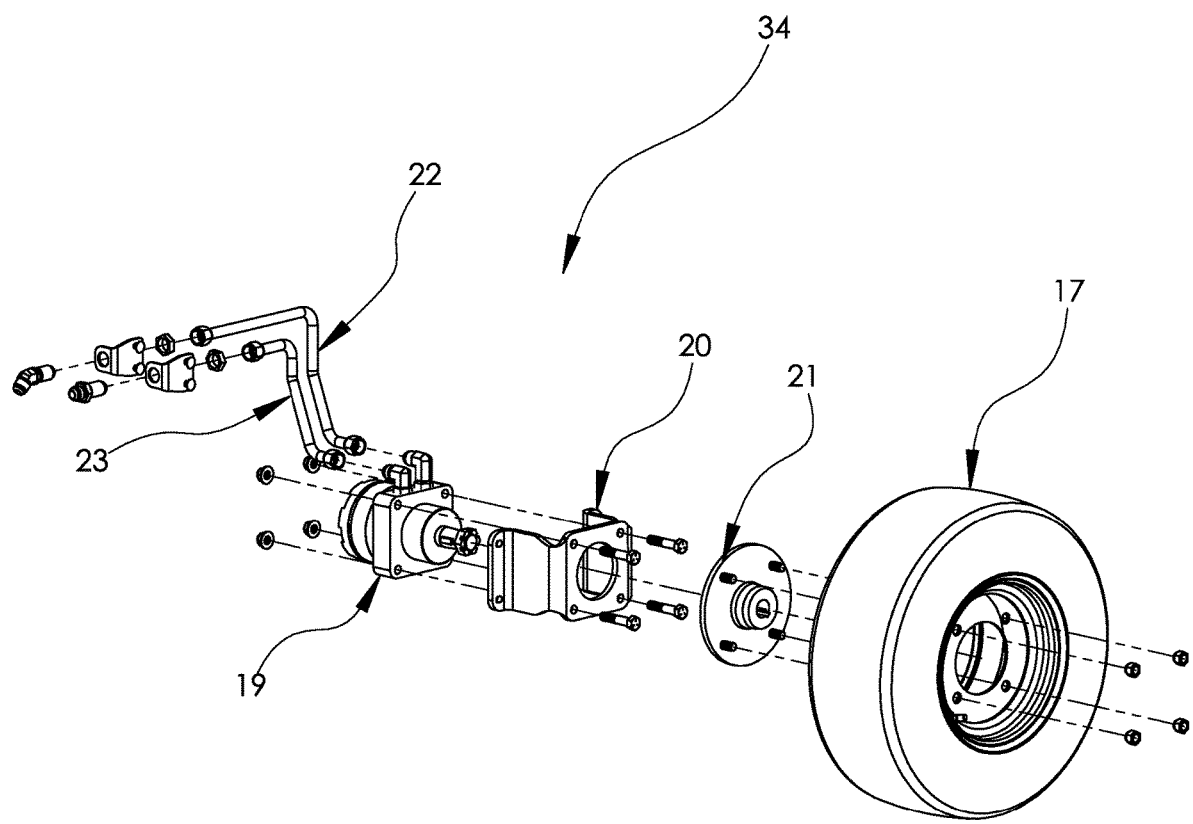
FIG. 10 is an exploded view of the rear drive wheel assembly from the riding aerator in FIG. 1.

FIG. 10 shows an exploded view of one of the hydraulic drive wheel assemblies 34. The hydraulic wheel motor 19 is bolted to the wheel motor bracket 20 which is then mounted to the side of the frame 24. The wheel hub 21 is attached to the hydraulic wheel motor 19. The wheel 17 is attached to the wheel hub 21 with lug nuts as shown. The hydraulic wheel motor 19 in this example is powered forward by hydraulic fluid being pumped by hydraulic pump 26 into hydraulic wheel motor 19 through hose 23, which then comes out of hose 22.

Figure 11:
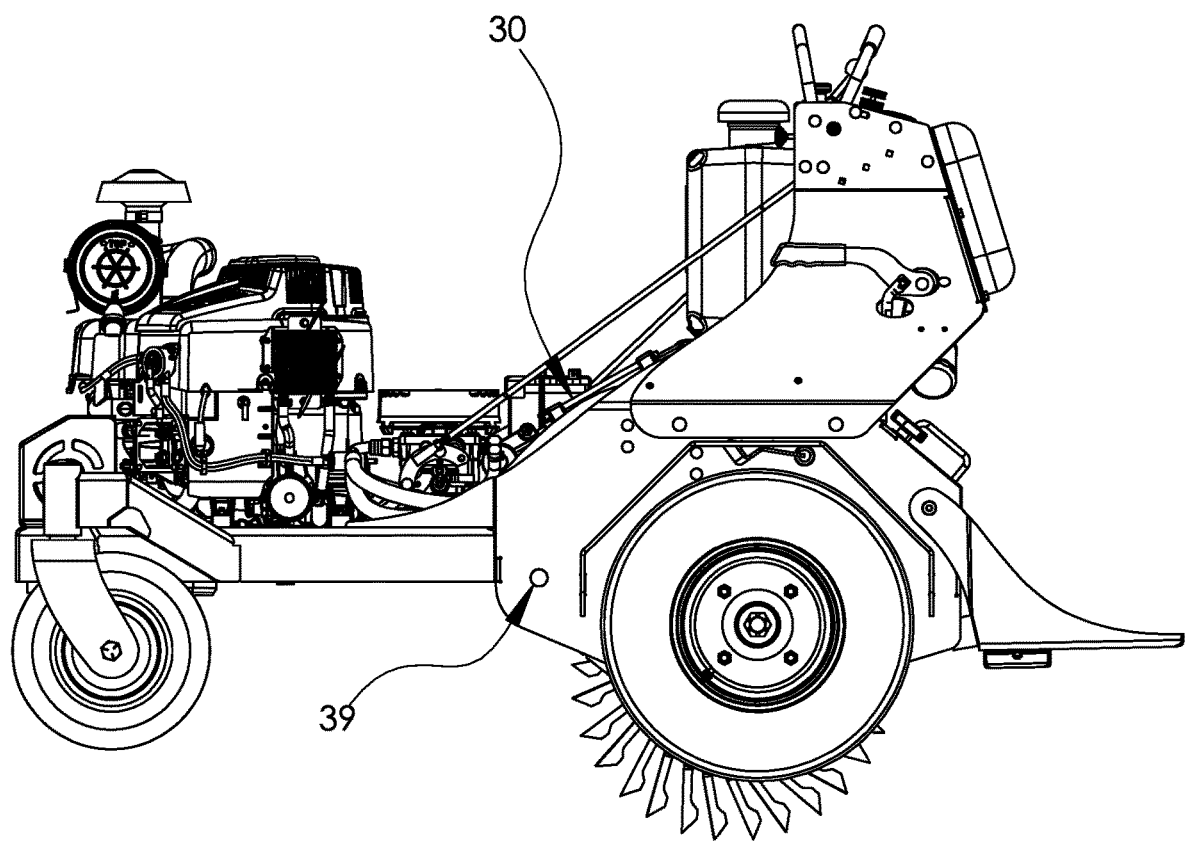
FIG. 11 is a side view of the riding aerator from FIG. 1 with the aerator tines in the down position.
Figure 12:
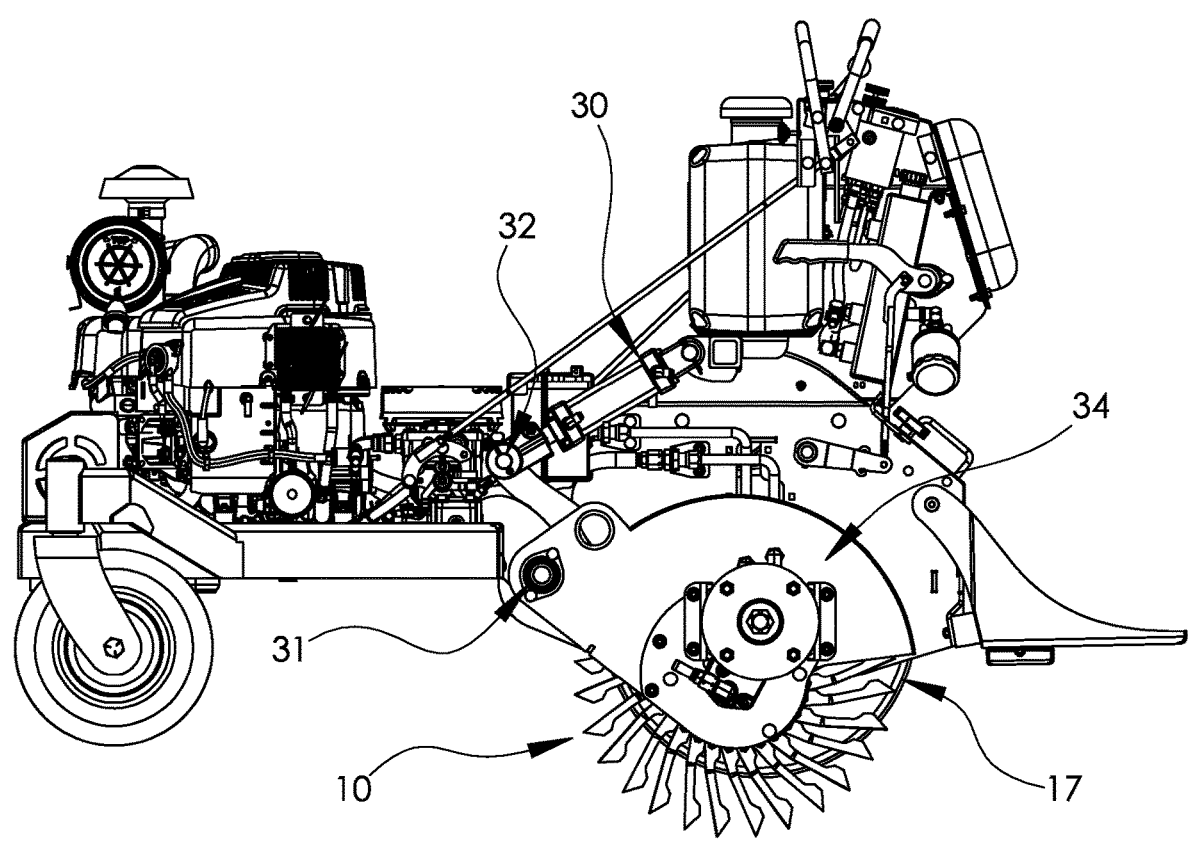
FIG. 12 is a side view of the riding aerator from FIG. 1 with the aerator tines in the down position and with a portion of the frame removed.
Figure 13:
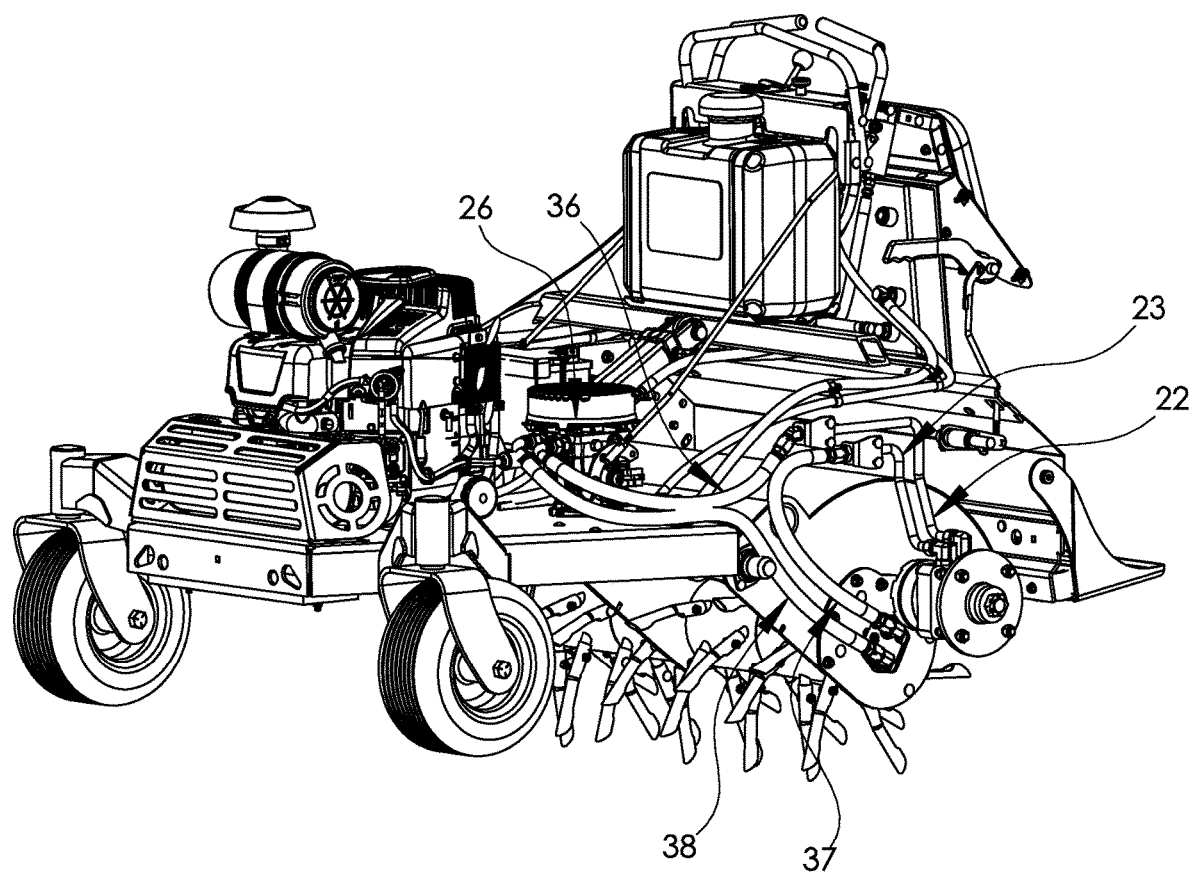
FIG. 13 is a perspective view of the riding aerator from FIG. 1 with the aerator tines in the down position and with a portion of the frame and the wheel removed.

FIGS. 11-13 show a side view of the riding aerator with the tines in the down or aerating position. With respect to FIG. 12, a portion of the left side of frame 24 is removed in order to better see the connection between cylinder 30 and trail arm drive assembly 10 at connector 32. The trail arm drive assembly 10 as described in FIG. 6 is mounted to bolt 39 using pivot bearing 31 on both sides. Gear pump 28, which is controlled by the operator, sends fluid to hydraulic cylinder 30 in order to raise and lower the trail arm drive assembly 10. In certain embodiments, cylinder 30 retracts to drop the trail arm drive assembly 10 and thus the tines 12, pressing the aerating tines 12 into the ground. Further, cylinder 30 can be extended to raise trail arm drive assembly 10 and thus tines 12, raising the aerating tines 12 out of the ground.

With the disclosed hydraulic drive configuration, there are no chains, sprocket, or chain tensioners to adjust and maintain. The hydraulic pumps drive the drive tine assemblies 11 and the rear drive wheels 17 through flexible hoses to each hydraulic drive motor, but rigid hydraulic lines could be used as well. In this example, when rotating the wheels and tines in reverse, the variable hydraulic pumps 26 and 27 send fluid from the pumps to the hydraulic tine motors 2 on either side of the trail arm drive assembly 10 (through hose 38 on the left side, for example) and then from the hydraulic tine motors 2 to the hydraulic wheel motors 19 on either side of the aerator 1 (through hose 37 and 23 on the left side, for example) and then back to each respective hydraulic pump 26 and 27 (through hose 22 and 36 on the left side, for example). The fluid moves in the opposite direction when rotating the wheels and tines in the forward direction. The order in which the hydraulic tine motors 2 and hydraulic wheel motors 19 receive fluid from the hydraulic pumps 26 and 27 to rotate in the forward and reverse direction can be the opposite of the order described above. The variable speed hydraulic pump 27, hydraulic tine motor 2, and the hydraulic wheel motor 19 on the right side of the machine are in series with each other so the drive tine drum 4 and wheel 17 move in unison (both in forward and reverse) with each other all the time. This setup is repeated on the left side of the aerator. The speed and direction of the fluid being pumped by the hydraulic pumps 26 and 27 are controlled by the operator from control tower assembly 29 using control levers. In certain embodiments there may be two control levers, one for each hydraulic pump 26 and 27.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

What is claimed is:

1. An aerator comprising:
    a frame;
    an engine;
    one or more hydraulic pumps;
    one or more drive wheels,
        wherein the one or more drive wheels are powered by one or more hydraulic wheel motors;
    one or more tine assemblies,
        wherein the one or more tine assemblies are directly coupled to one or more hydraulic tine motors; and
        wherein the one or more hydraulic pumps power the one or more hydraulic tine motors and the one or more hydraulic wheel motors to rotate the one or more drive wheels and the one or more tine assemblies at similar speeds, wherein the one or more drive wheels or tine assemblies or a combination thereof propel the aerator.

2. The aerator of claim 1, wherein the frame further includes an operator platform.

3. The aerator of claim 1, wherein the one or more tine assemblies are capable of being lowered into an aerating position and raised into a non-aerating position.

4. The aerator of claim 1, where the one or more drive wheels are mounted to the frame.

5. The aerator of claim 1, wherein said one or more tine assemblies can be raised or lowered by an operator at any time.

6. The aerator of claim 1, wherein the one or more tine assemblies have replaceable tines attached to an outside surface of a rotating drum.

7. The aerator of claim 1, wherein the one or more tine assemblies rotate around bearings shielded from debris or inside a drum.

8. The aerator of claim 1, wherein the one or more tine assemblies are powered by a drive motor substantially contained within a drum.

9. The aerator of claim 1, wherein a centerline rotation of the one or more tine assemblies is within 24 inches of the centerline of the one or more drive wheels.

10. The aerator of claim 1, wherein the one or more tine assemblies are float tine assemblies and mounted along a drive axis of the of a driven tine assembly that is coupled to a tine motor; and wherein the float tine assemblies are allowed to freely turn.

11. The aerator of claim 1, wherein the one or more hydraulic pumps are coupled to the engine with a toothed timing belt.

\* \* \* \* \*